United States Patent
Gavrilets et al.

(10) Patent No.: US 9,638,526 B1
(45) Date of Patent: *May 2, 2017

(54) GPS CARRIER-PHASE BASED RELATIVE NAVIGATION

(71) Applicant: Rockwell Collins, Inc., Cedar Rapids, IA (US)

(72) Inventors: Vladislav Gavrilets, Fairfax, VA (US); Patrick Hwang, Cedar Rapids, IA (US); Gary McGraw, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,800

(22) Filed: Sep. 29, 2014

Related U.S. Application Data

(63) Continuation of application No. 13/835,847, filed on Mar. 15, 2013, now Pat. No. 8,849,481.

(51) Int. Cl.
| | |
|---|---|
| *G01C 21/00* | (2006.01) |
| *G01C 21/20* | (2006.01) |
| *G01S 19/01* | (2010.01) |
| *G05D 1/04* | (2006.01) |
| *G05D 1/08* | (2006.01) |

(52) U.S. Cl.
CPC ............. *G01C 21/20* (2013.01); *G01S 19/01* (2013.01); *G05D 1/042* (2013.01); *G05D 1/0808* (2013.01)

(58) Field of Classification Search
CPC ........ G05D 1/02; G05D 1/042; G05D 1/0808; G01C 21/20; G01S 19/01
See application file for complete search history.

(56) References Cited

U.S. PATENT DOCUMENTS

| | | | | |
|---|---|---|---|---|
| 4,914,598 A | * | 4/1990 | Krogmann | G01C 21/16 244/177 |
| 5,999,123 A | * | 12/1999 | Disselkoen | G01S 19/43 342/357.26 |

* cited by examiner

*Primary Examiner* — Yuen Wong
(74) *Attorney, Agent, or Firm* — Angel N. Gerdzhikov; Donna P. Suchy; Daniel M. Barbieri

(57) ABSTRACT

Systems and methods for navigation of a vehicle may carry out one or more operations including, but not limited to: obtaining coordinates of a vector connecting two points in space using carrier phase measurements from global navigation system satellites (GNSS); setting the vector as an intended path of a vehicle; storing carrier phase signals from a GNSS receiver received at a first position of the vehicle; receiving carrier phase signals from a GNSS receiver at a second position of the vehicle; and determining a position of the vehicle relative to the intended path from one or more carrier phase signals received at the second position and one or more stored carrier phase signals received at the first position.

20 Claims, 7 Drawing Sheets

GPS CARRIER-PHASE BASED RELATIVE NAVIGATION

PRIORITY

This application claims priority to U.S. patent application Ser. No. 13/835,847 filed Mar. 15, 2013 which is hereby incorporated by reference in its entirety.

BACKGROUND

Vehicles (e.g. unmanned aerial vehicles (UAVs)) may be required to perform automatic two-dimensional and/or three-dimensional navigation and guidance operations (e.g. automatic takeoffs and/or landings from a runway).

SUMMARY

Systems and methods for navigation of a vehicle may carry out one or more operations including, but not limited to: obtaining coordinates of a vector connecting two points in space using carrier phase measurements from global navigation system satellites (GNSS); setting the vector as an intended path of a vehicle; storing carrier phase signals from a GNSS receiver received at a first position of the vehicle; receiving carrier phase signals from a GNSS receiver at a second position of the vehicle; and determining a position of the vehicle relative to the intended path from one or more carrier phase signals received at the second position and one or more stored carrier phase signals received at the first position.

BRIEF DESCRIPTION OF FIGURES

The numerous objects and advantages of the present invention may be better understood by those skilled in the art by reference to the accompanying figures in which.

DETAILED DESCRIPTION

Vehicles (e.g. unmanned aerial vehicles (UAVs)) may be required to perform automatic two-dimensional and/or three-dimensional navigation and guidance operations (e.g. takeoffs and/or landings from a runway). However, the runways used for such auto-takeoffs may be very narrow (e.g. a stretch of road) and located in remote locations away from pre-existing ground and flight control installations. As such, accurate & reliable positioning information is needed to ensure that a vehicle continues to travel along an intended path.

Figure 1:
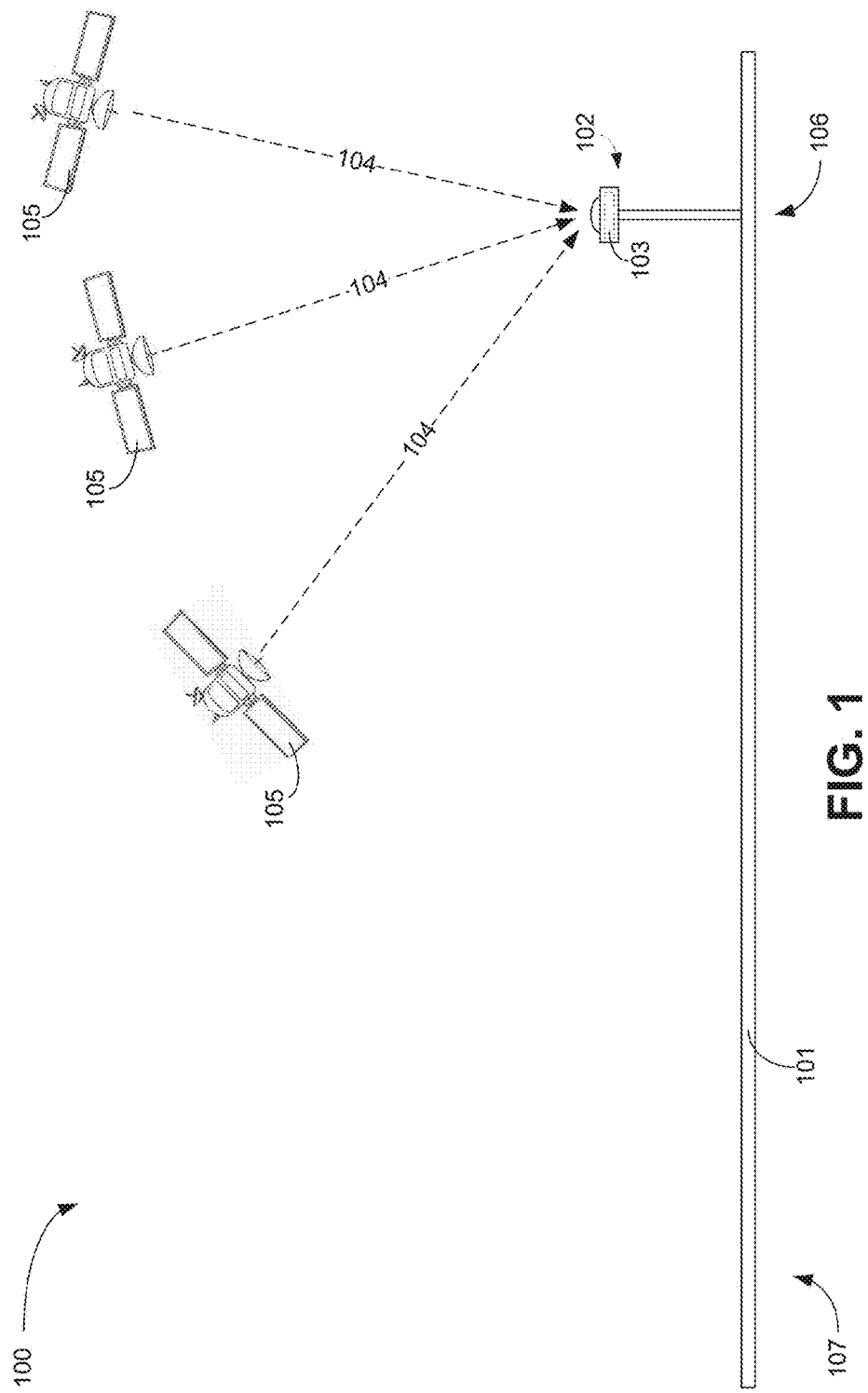
FIG. 1 illustrates a system for determining a vector associated with an intended heading of a vehicle.
Figure 2:
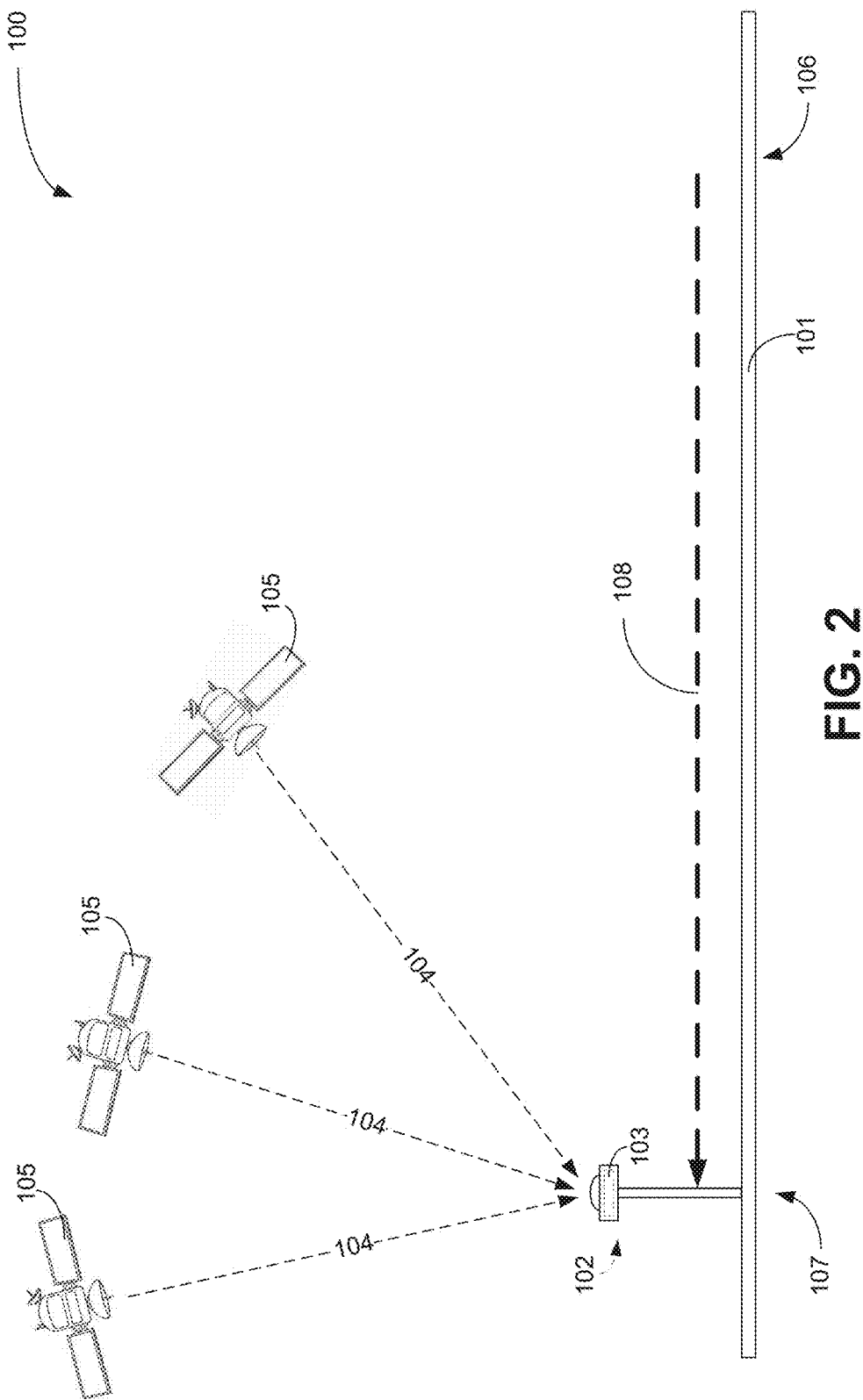
FIG. 2 illustrates a system for determining a vector associated with an intended heading of a vehicle.

Referring to FIGS. 1 and 2, an environmental view 100 of exemplary embodiments are shown. Prior to an attempted automatic takeoff for an aircraft, a survey of a runway 101 may be taken. For example, a survey device 102 may include a global navigation satellite system (GNSS) receiver 103. The GNSS receiver 103 may sample GNSS measurements 104 from one or more GNSS satellites 105 at a first position 106 (e.g. the centerline at a takeoff start point on one end of the runway 101) and a second position 107 (e.g. a position at the other end of the runway 101 on the runway centerline). A vector 108 connecting first position 106 and the second position 107 may then be computed from the GNSS measurements gathered at first position 106 and the second position 107.

In an embodiment, the survey of the runway 101 may employ time-relative positioning techniques to determine coordinates of a vector connecting two positions (e.g. the first position 106 at one end of the runway and the second position 107 at the other end of the runway).

As noted in U.S. Pat. No. 5,999,123 which is incorporated herein to the extent not inconsistent herewith, a measurement equation for the carrier phase associated with a given GNSS satellite 105 may be described mathematically as:

$$\phi(t_k) - \phi(t_0) = [r_k + N] - [r_0 + N] \qquad \text{Eqn. 1}$$

which is equivalent to:

$$[\phi(t_k) - \phi(t_0)] - [d(x^*, t_k) - d(x^*, t_0)] = h(t_k) \cdot [x(t_k) - x^*] - h(t_0) \cdot [x(t_0) - x^*] \qquad \text{Eqn. 2}$$

where:
$\phi(t_k)$ is a carrier phase detected at a first time/position $t_k$ (e.g. a second position 107);
$\phi(t_0)$ is a carrier phase detected at a second point time/position $t_0$ (e.g. a first position 106);
$r_k$ is a range plus range bias at $t_k$;
$r_0$ is a range plus range bias at $t_0$
N is an integer cycle ambiguity;
$h(t_k)$ are the direction cosines at $t_k$;
$h(t_0)$ are the direction cosines at $t_0$;
$x(t_k)$ is the position and range bias errors at $t_k$
$x(t_0)$ is the position and range bias error at $t_0$ (range bias error may be arbitrarily set to 0 at $t_0$);
$x^*$ is a true position at $t_0$;
$d(x^*, t_k)$ is a geometric range from $x^*$ to a given GNSS satellite 105 plus deterministic biases at $t_k$; and
$d(x^*, t_0)$ is a geometric range from $x^*$ to a given GNSS satellite 105 plus deterministic biases at $t_0$.

Written in a different way Eqn. 1 may be characterized as:

$$[\phi(t_k) - \phi(t_0)] - [d(x^*, t_k) - d(x^*, t_0)] = h(t_k) \cdot [x(t_k) - x(t_0)] + [h(t_k) - h(t_0)] \cdot [x(t_0) - x^*] \qquad \text{Eqn. 3}$$

The second term on the right-hand side representing the assumed position error $[x(t_0) - x^*]$ may be ignored as no change in the term would be observable over a short time interval (e.g. 100 seconds). In addition, $[h(t_k) - h(t_0)]$, is very nearly zero so its contribution is also small over a short time interval. Thus, ultimate solution of Eqns. 2 and 3, consists of solving for the term $[x(t_k) - x(t_0)]$.

Additionally, if the carrier phase observation and deterministic biases are incorporated into the term carrier phase $\phi(t)$, where $\phi(t) = \phi(t) - d(x^*, t)$ then Eqn. 2 reduces to:

$$[\phi(t_k) - \phi(t_0)] = h(t_k) \cdot [x(t_k) - x(t_0)] \qquad \text{Eqn. 4.}$$

Once the carrier phase and direction cosine values for each of a group of GNSS satellites 105 (e.g. a group of at least 4 satellites 1-4) is known for the first position 106 and the second position 107, the solutions for the relative position differences $[x(t_k) - x(t_0)]$ between the first position 106 and the second position 107 may be computed by solving Eqn. 4 for the set of GNSS satellites 105, simultaneously, as follows (where $x_1$ $x_2$ and $x_3$ are position components and $x_4$ is range bias):

$$\begin{bmatrix} x_1(t_k) - x_1(t_0) \\ x_2(t_k) - x_1(t_0) \\ x_3(t_k) - x_3(t_0) \\ x_4(t_k) - x_4(t_0) \end{bmatrix} = (H^T H)^{-1} H^T \cdot \begin{bmatrix} \varphi_1(t_k) - \varphi_1(t_0) \\ \varphi_2(t_k) - \varphi_2(t_0) \\ \varphi_3(t_k) - \varphi_3(t_0) \\ \varphi_4(t_k) - \varphi_4(t_0) \\ \vdots \end{bmatrix} \quad \text{Eqn. 5}$$

where $$H = \begin{bmatrix} h_1(t_k) \\ h_2(t_k) \\ h_3(t_k) \\ h_4(t_k) \\ \vdots \end{bmatrix}$$

Referring again to FIGS. 1 and 2, the survey device 102 including the GNSS receiver 103 may capture and store carrier phase values for each of the available GNSS measurements 104 at the first position (e.g. the first position 106) and the second position (e.g. the second position 107). The survey device 102 may process the obtained carrier phase values to compute an intended path vector 108 that represents a straight line adjoining the first position 106 and the second position 107.

Following computation of the vector 108, that vector 108 may be provided to a vehicle for use in two dimensional navigation and guidance operations. Though described herein with respect to navigational operations for an aircraft 109 it will be recognized that the systems and methodologies may be applied to any type of vehicle (e.g. a ground-based vehicle, a water-based vehicle, and the like) without departing from the scope of the present disclosures.

Figure 3:
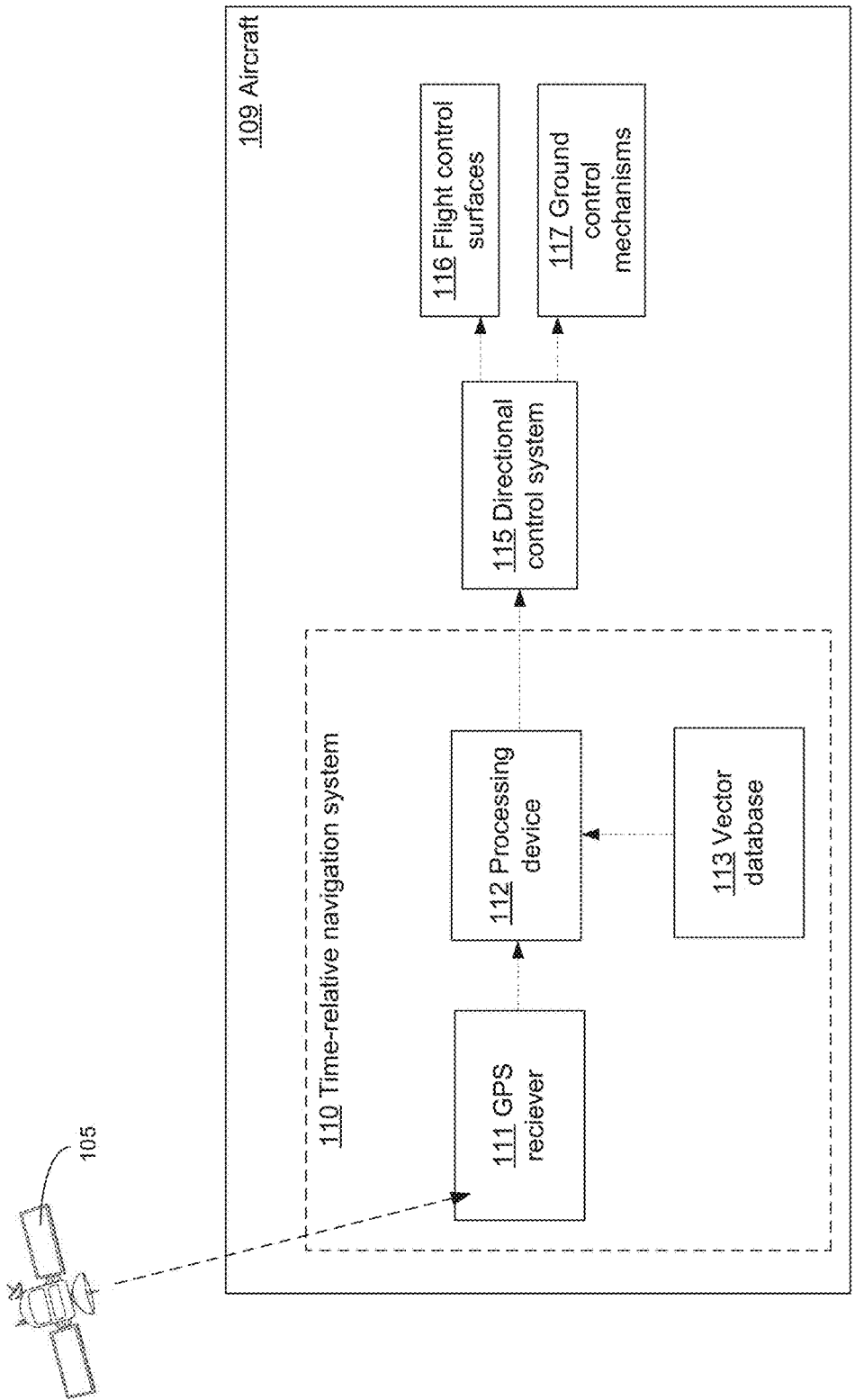
FIG. 3 illustrates a system for two dimensional navigation and guidance of a vehicle.

For example, as shown in FIG. 3, an aircraft 109 may include a time-relative navigation system 110. The time-relative navigation system 110 may include a GNSS receiver 111, a processing device 112, and a vector database 113. As noted above, at least one vector 108 associated with a prior survey of a geographic area (e.g. a runway 101) may be provided to the time-relative navigation system 110 and stored in the vector database 113.

Figure 4:
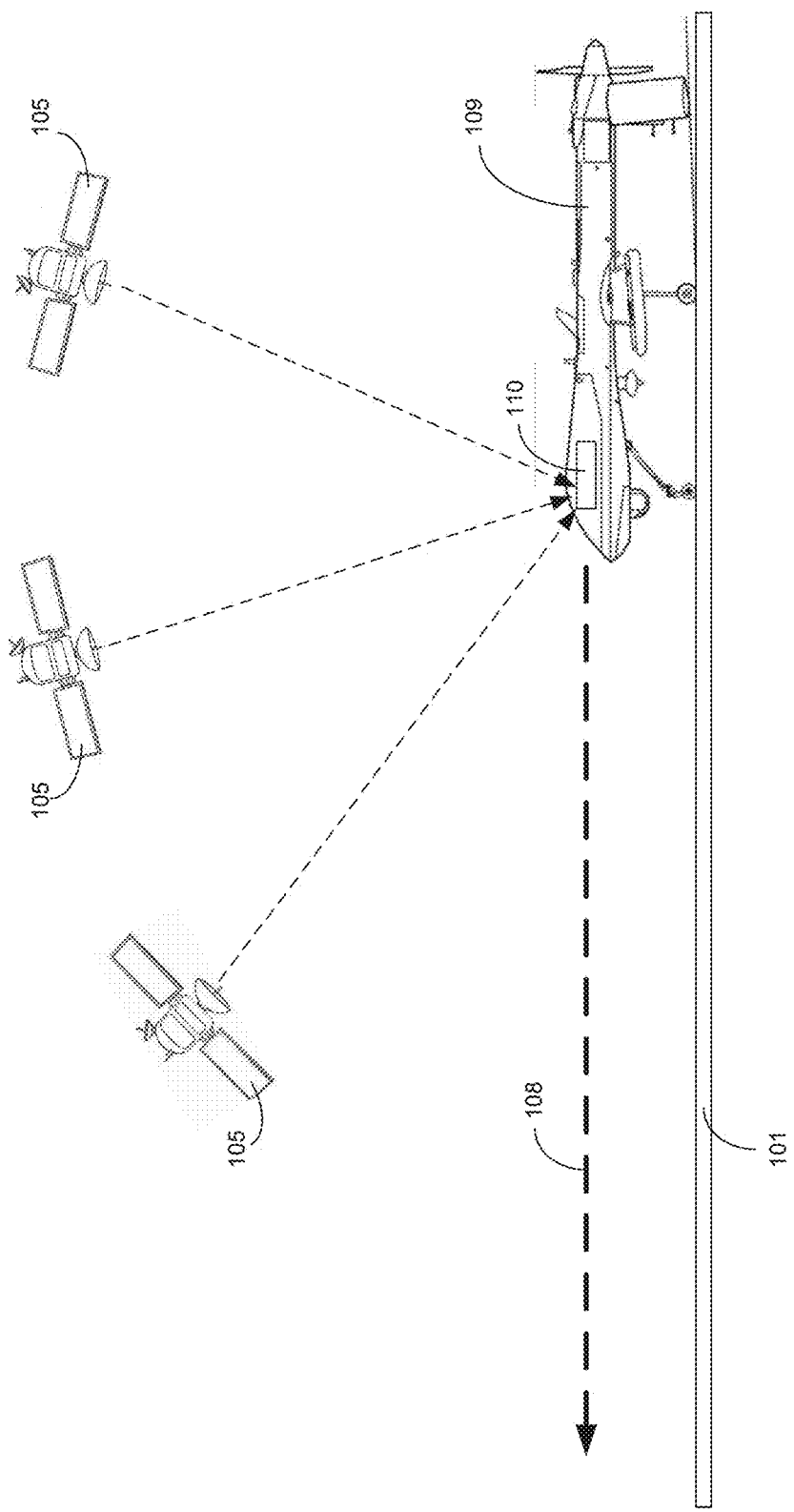
FIG. 4 illustrates a system for two dimensional navigation and guidance of a vehicle.
Figure 5:
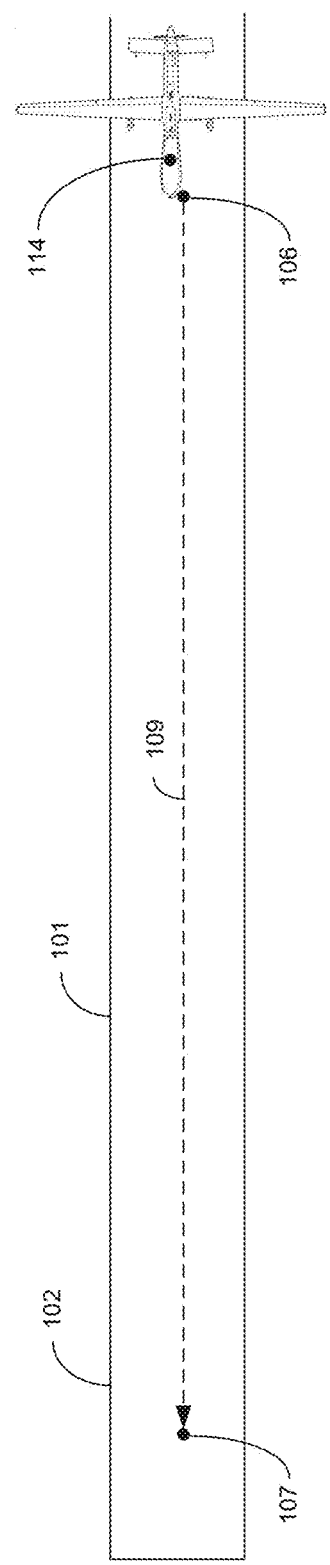
FIG. 5 illustrates a system for two dimensional navigation and guidance of a vehicle.

Referring to FIGS. 4-5, an aircraft 109 may be positioned at the first position 106 relative to the runway 101 facing in a direction of intended takeoff. The processing device 112 may retrieve a vector 108 previously computed for the runway 101 from the vector database 113. Further, the processing device 112 may gather GNSS carrier phases at an initial position 114 of the aircraft 109.

Referring again to FIG. 3, in order to retain the aircraft 109 within the bounds of the runway 101 during transit and takeoff, the processing device 112 may provide one or more control signals to a directional control system 115 to steer aircraft 109 toward the centerline of the runway (with the runway defined as the vector connecting the first position 106 with the second position 107). The directional control system 115 may be configured to control various directional control elements of the aircraft 109 during takeoff. For example, the directional control system 115 may control one or more flight control surfaces 116 (e.g. a rudder, elevators, ailerons, etc.) and/or one or more ground steering mechanisms 117 (e.g. brakes, nose wheel steering, etc.).

Figure 6:
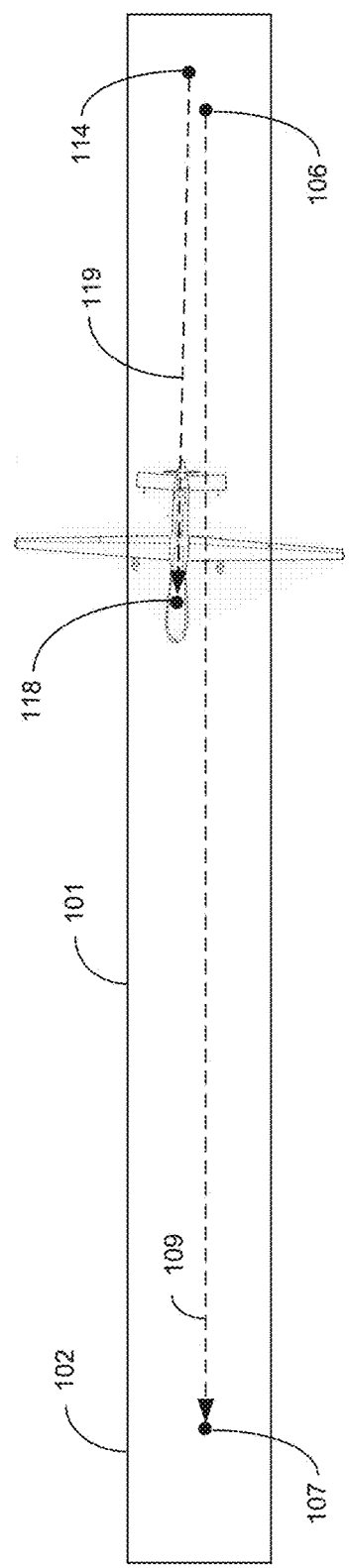
FIG. 6 illustrates a system for two dimensional navigation and guidance of a vehicle.

Referring to FIG. 6, as the aircraft 109 moves forward down the runway, the processing device 112 of the time-relative navigation system 110 may progressively compute a current position 118 of the aircraft 109 from the carrier phase of the GNSS measurements 104 as described above. After computation of the current position 118 of the aircraft 109, the processing device 112 may determine a current relative position vector 119. The processing device 112 may then compute the shortest distance between current aircraft position and runway centerline, and apply corrective control signals to steer the aircraft toward the runway centerline.

The time-relative navigation solution described above drifts at a rate of roughly 2 mm/sec, 1 sigma due to satellite clock drift (all other sources of errors canceling out). As typical takeoff roll is completed in less than 40 seconds, by the time of rotation, position error will be about 8 cm, 1 sigma, or relatively negligible compared to steering accuracy.

To make the algorithm reliable, a mechanism for detecting and excluding cycle slips may be employed. This can be done using residual monitoring, and if a dual frequency GNSS receiver 111 is available, using cross-frequency carrier phase check. For example, if L1 frequency is spoofed or jammed, the algorithm may use L2 carrier phase only.

Figure 7:
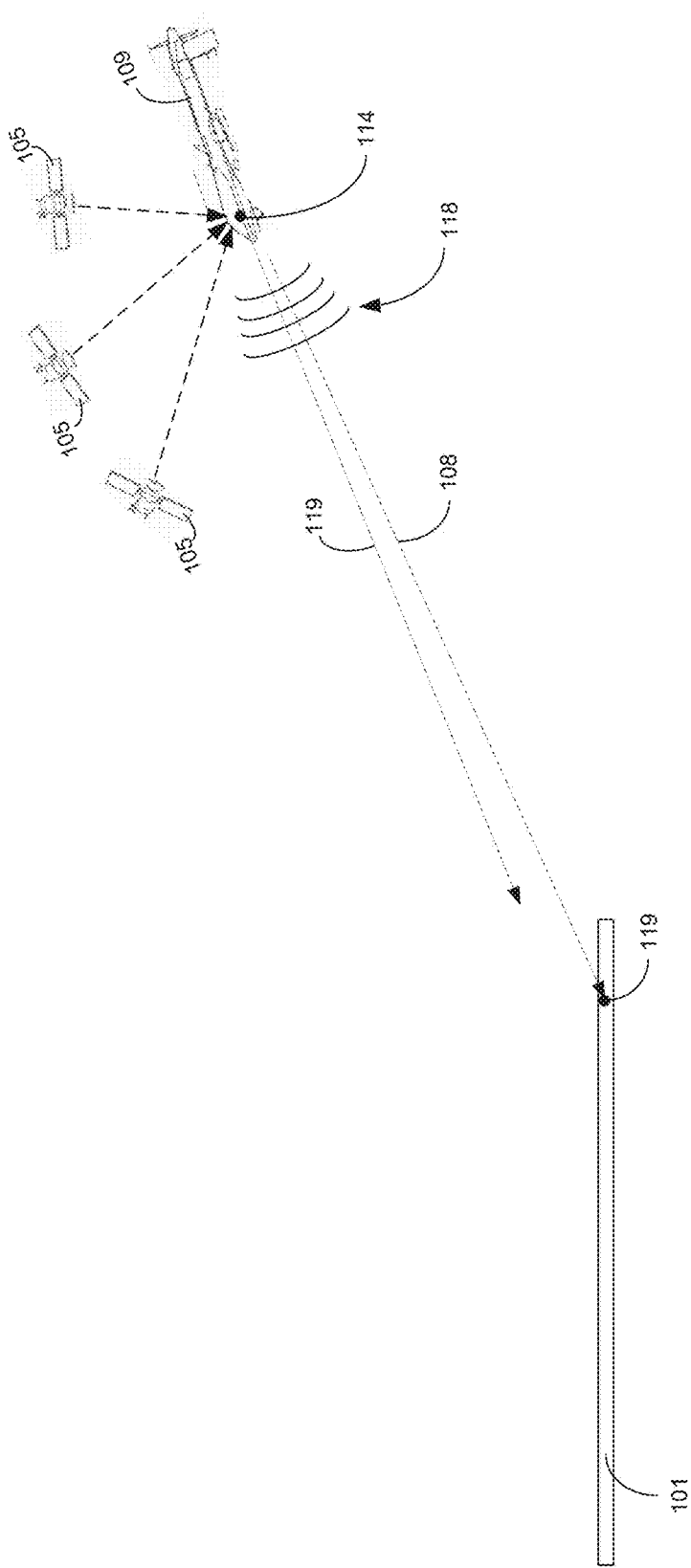
FIG. 7 illustrates a system for three dimensional navigation and guidance of a vehicle.

In an alternate embodiment, the relative navigation and guidance methodologies described above may also be employed during flight of the aircraft 109. For example, methodologies can also be used as a cross-check or a backup for ground tracking radar and/or inertial guidance used for automatic landing. For example, as shown in FIG. 7, aircraft 109 may employ ground tracking radar 120 to generate azimuth, elevation, and range of the aircraft 109 relative to a landing point 121. From this azimuth, elevation, and range data, an intended path vector 108 between a present position of the aircraft 109 and the landing point 121 may be computed and saved to the vector database 113. Similar to the methodologies described above, as the aircraft 109 proceeds towards the landing point 121, the time-relative navigation system 110 may progressively determine the relative position vector 119 of the aircraft 109 from the carrier phase of the GNSS measurements 104 and compute a differential to the vector 108. In one embodiment, a notification associated with the relative differential may be displayed to an operator (e.g. a pilot or UAV control officer) or provided to a monitoring system in order to provide a cross-check with respect to the operations of the ground tracking radar 120. In another embodiment, the time-relative navigation system 110 may provide a redundant control system for automatic landings. For example, a now-malfunctioning ground tracking radar 120 may have previously determined a vector 108. The computed relative differential between that vector 108 and a relative position vector 119 may be determined and corrective control signals may be provided to the directional control system 115 to turn the aircraft 109 towards the vector 108 to retain aircraft on the intended landing path.

While described above in the context of use of carrier phase measurements of GNSS satellites in vehicle navigation, GNSS velocity measurements may be computed based on such carrier phases differenced over short time segments (e.g. 1 second or less). As such, the present disclosures fully contemplate the use of such GNSS velocity measurements derived from carrier phases to perform vehicle navigation operations similar to those described herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which could be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A system comprising:
   at least one of a ground tracking radar system or an inertial guidance system;
   a global navigation system satellite (GNSS) signal receiver;
   a directional control system including control motors; and
   at least one computing device in communication with the directional control system, the at least one computing device programmed for:
      determining a first relative position vector connecting two points in space occupied by a vehicle at different times from at least one of ground tracking radar data or inertial guidance system data;
      determining a second relative position vector connecting the two points in space using GNSS carrier phase measurements obtained at the two points;
      comparing the first relative position vector and the second relative position vector to determine one or more coordinate differences between the first vector and the second vector;
      providing, via a communication link, at least one notification indicative of the one or more coordinate differences between the first relative position vector and the second relative position vector to one of the at least one computing device and a display of the vehicle for a directional adjustment by the directional control system based on the one or more coordinate differences; and
      controlling, via the directional control system, upon receipt of one or more control signals to perform the directional adjustment to redirect the vehicle to the first relative position vector thereby minimizing the one or more coordinate differences.

2. The system of claim 1, wherein the directional control system is in communication with one of a ground steering mechanism and a flight control surface.

3. The system of claim 2, wherein the ground steering mechanism comprises a brake or a wheel steering mechanism, and wherein the flight control surface comprises a rudder, and elevator, or an aileron.

4. The system of claim 1, further comprising a vector database for storing at least the first relative position vector.

5. The system of claim 4, wherein the computing device is further configured to receive a notification of a ground tracking radar system malfunction or an inertial guidance system malfunction.

6. The system of claim 5, wherein the computing device is further configured to access the first relative position vector from the vector database for the comparing due to receiving the notification of the ground tracking radar system malfunction or the inertial guidance system malfunction.

7. The system of claim 6, wherein the directional control system comprises an automatic directional control system receiving the one or more control signals to perform the directional adjustment and redirect the vehicle to the first relative position vector.

8. The system of claim 6, wherein the display provides the notification to an operator of the vehicle for directing the operator to perform the directional adjustment.

9. The system of claim 1, wherein the GNSS signal receiver is configured to receive a first plurality of carrier phase signals at a first point of the two points in space and a second plurality of carrier phase signals at a second point of the two points in space.

10. The system of claim 9, wherein the computing device uses the first plurality of carrier phase signals and the second plurality of carrier phase signals to derive one or more velocities of the vehicle.

11. A system comprising:
at least one of a ground tracking radar system or an inertial guidance system;
a global navigation system satellite (GNSS) signal receiver configured to receive a plurality of carrier phase signals;
a control system for a directional adjustment including control motors; and
at least one computing device programmed for:
determining a first relative position vector connecting two points in space occupied by a vehicle at different times from at least one of ground tracking radar data or inertial guidance system data;
determining a second relative position vector connecting the two points in space using GNSS carrier phase measurements obtained at the two points from the plurality of carrier phase signals;
comparing the first relative position vector and the second relative position vector to determine one or more coordinate differences between the first vector and the second vector;
providing, via a communication link, at least one notification indicative of the one or more coordinate differences between the first relative position vector and the second relative position vector to a monitoring system for a cross-check of the ground tracking radar system or the inertial guidance system, the monitoring system in communication with the control system; and
redirecting, via the control system, the vehicle to the first relative position vector according to one or more control signals indicating the directional adjustment to minimize the one or more coordinate differences, wherein the redirecting is based on one of: the cross-check and the at least one notification.

12. The system of claim 11, wherein the control system comprises an automatic control system configured to receive the one or more control signals to perform the directional adjustment to the vehicle.

13. The system of claim 12, wherein the automatic control system comprises a first automatic control system and a second, redundant automatic control system, each of which are configured to receive the one or more control signals to perform the directional adjustment.

14. The system of claim 13, wherein the cross-check performed by the monitoring system indicates a malfunction in the ground tracking radar system or the inertial guidance system, and upon receipt of the indication of the malfunction the second automatic control system is configured to receive the one or more control signals to perform the directional adjustment to the vehicle based on the one or more coordinate differences.

15. The system of claim 13, wherein the second automatic control system is in communication with the GNSS receiver, the GNSS receiver being configured to receive and store a first plurality of carrier phase signals at a first point of the two points in space and receive a second plurality of carrier phase signals at a second point of the two points in space.

16. The system of claim 11, wherein the plurality of carrier phase signals are used to derive a velocity of the vehicle to adjust a speed of the vehicle.

17. An electronic circuit, comprising:
one or more electrical circuitries configured for a) communicating with a global navigation satellite system (GNSS) signal receiver of a vehicle, the GNSS signal receiver configured to receive a plurality of carrier phase signals, b) communicating with a control system and c) communicating with a processor and a memory medium to perform instructions to conduct a plurality of steps, the plurality of steps comprising:
obtain, by the GNSS receiver, coordinates of a first vector connecting two points in space;
set the first vector as an intended path of the vehicle;
determine, by the processor, a second vector connecting two points in space using GNSS carrier phase measurements obtained at the two points, the second vector comprising a relative position vector of the vehicle;
compare, by the processor, the first vector and the second vector to determine one or more coordinate differences between the first vector and the second vector representing a deviation of the vehicle from the intended path of the vehicle;
provide a notification indicative of the deviation to the control system for a directional adjustment based on the one or more coordinate differences; and
control, via the control system upon receipt of one or more control signals, performing the directional adjustment to redirect the vehicle to the first vector thereby correcting the deviation by minimizing the one or more coordinate differences.

18. The electronic circuit of claim 17, wherein the control system comprises a monitoring system or a directional control system including control motors in communication with a first navigational control system and a second navigational control system, each of which are configured to compute at least the second vector, and wherein the intended path comprises one of a takeoff path and a landing path.

19. The electronic circuit of claim 18,
wherein the control system comprises the monitoring system and the directional control system,
wherein the monitoring system is configured to perform a cross-check of the first navigational system to determine if a malfunction in the first navigational system of the vehicle has occurred,
wherein a display or an automatic directional control system receives the one or more control signals from the control system and the second navigational system to redirect the vehicle to the intended path when the malfunction in the first navigational system has occurred, and
wherein the second navigational system comprises the GNSS receiver and the first navigational system comprises one of a ground tracking radar system and an inertial guidance system.

20. The electronic circuit of claim 18,
wherein the one or more control signals comprise a first one or more control signals and a second one or more control signals, the first one or more control signals being provided to a display or an automatic directional control system for directing the directional adjustment, and wherein the control system is configured to receive the second one or more control signals for the performing the directional adjustment.

\* \* \* \* \*